United States Patent
De Block

(10) Patent No.: US 9,015,896 B2
(45) Date of Patent: Apr. 28, 2015

(54) WIPER BLADE FOR A WINDSHIELD WIPER

(75) Inventor: Peter De Block, Halen (BE)

(73) Assignee: Robert Bosch GmbH, Stuttgart (DE)

( * ) Notice: Subject to any disclaimer, the term of this patent is extended or adjusted under 35 U.S.C. 154(b) by 205 days.

(21) Appl. No.: 13/639,901

(22) PCT Filed: Feb. 7, 2011

(86) PCT No.: PCT/EP2011/051700
§ 371 (c)(1),
(2), (4) Date: Oct. 8, 2012

(87) PCT Pub. No.: WO2011/124404
PCT Pub. Date: Oct. 13, 2011

(65) Prior Publication Data
US 2013/0036571 A1   Feb. 14, 2013

(30) Foreign Application Priority Data
Apr. 6, 2010  (DE) .......................... 10 2010 003 645

(51) Int. Cl.
*B60S 1/38* (2006.01)

(52) U.S. Cl.
CPC .............. *B60S 1/3855* (2013.01); *B60S 1/3879* (2013.01); *B60S 2001/382* (2013.01)

(58) Field of Classification Search
CPC ............................ B60S 1/3855; B60S 1/3879
USPC ............. 15/250.32, 250.43, 250.44, 250.201, 15/250.361, 250.451–250.48; 264/248, 264/442–445
See application file for complete search history.

(56) References Cited

U.S. PATENT DOCUMENTS

| | | | | |
|---|---|---|---|---|
| 4,995,931 | A | * | 2/1991 | Duthie .......................... 156/212 |
| 5,338,051 | A | * | 8/1994 | Szafranski et al. ........... 280/607 |
| 7,523,522 | B2 | * | 4/2009 | Herring et al. ............. 15/250.32 |
| 2010/0275403 | A1 | | 11/2010 | Jollec |

FOREIGN PATENT DOCUMENTS

| | | |
|---|---|---|
| DE | 10333082 A1 | 2/2005 |
| DE | 102009002411 A1 | 10/2010 |
| EP | 1359073 B1 | 7/2006 |
| WO | 02/04269 | 1/2002 |
| WO | 2008/036894 A2 | 3/2008 |

OTHER PUBLICATIONS

International Search Report for Application No. PCT/EP2011/051700 dated May 26, 2011 (English Translation and Original, 4 pages).

* cited by examiner

*Primary Examiner* — Mark Spisich
*Assistant Examiner* — Andrew A Horton
(74) *Attorney, Agent, or Firm* — Michael Best & Friedrich LLP

(57) ABSTRACT

In a wiper blade (100) for a windshield wiper, having a wiping strip (112) on which there is arranged at least one supporting rail (214) which has a spring element (215) provided with a plastic sheath (217), wherein the plastic sheath (217) is welded, at least in a predefined connecting region (180), to a base connecting device (160) which comprises thermoplastic material having a predefined melting point, the plastic sheath (217) comprises at least a first and a second thermoplastic material.

16 Claims, 3 Drawing Sheets

WIPER BLADE FOR A WINDSHIELD WIPER

REFERENCE TO RELATED APPLICATIONS

This application is a 371 of PCT/EP2011/051700, filed Feb. 7, 2011, which claims the benefit of German Patent Application No. 10 2010 003 645.5, filed Apr. 6, 2010, each of which are incorporated herein by reference.

BACKGROUND OF THE INVENTION

The present invention concerns a wiper blade for a windshield wiper having a wiping strip on which there is arranged at least one supporting rail which has a spring element provided with a plastic sheath, wherein the plastic sheath is welded, at least in a predefined connecting region, to a base connecting device which comprises a thermoplastic material with a predefined melting point.

EP 1 359 073 B1 describes such a wiper blade with a wiping strip which on its long sides has opposing longitudinal grooves in which are arranged, spaced apart, longitudinal strips of a carrier element, wherein adjacent ends of the longitudinal strips are joined together by means of a connecting piece. Engagement elements of a connecting device are welded to the long sides of longitudinal strips facing away from each other such that they resist shear forces in a direction along the longitudinal strips. This connecting device and the engagement elements comprise a piece of a thermoplastic material and the longitudinal strips are provided with a sheath formed from this thermoplastic material.

The disadvantage with this prior art is that e.g. due to slipping of one of the longitudinal strips or both longitudinal strips relative to the wiping strip before a corresponding welding process, the engagement elements of the connecting device can be welded to the longitudinal strip or strips at an incorrect position.

SUMMARY OF THE INVENTION

One object of the invention is therefore to provide a new wiper blade for a windshield wiper, in which welding of an allocated base connection device in an incorrect position on the corresponding supporting rail of the wiper blade can be avoided.

This problem is solved by a wiper blade for a windshield wiper having a wiping strip on which there is arranged at least one supporting rail which has a spring element provided with a plastic sheath. The plastic sheath is welded, at least in a predefined connecting region, to a base connecting device which comprises a thermoplastic material with a predefined melting point. The plastic sheath comprises at least one first and one second thermoplastic material.

The invention thus allows the provision of a wiper blade with a supporting rail to which the base connecting device can be welded substantially exclusively in predefined positions in which e.g. the plastic sheath comprises the second thermoplastic material.

The problem cited initially is also solved by a wiper blade for a windshield wiper having a wiping strip on which there is arranged at least one supporting rail which has a spring element provided with a plastic sheath. The plastic sheath comprises a thermoplastic material with a predefined melting point and is welded, at least in a pre-specified connecting region, to a base connecting device. The base connecting device comprises at least one first and one second thermoplastic material.

The invention thus allows the provision of a simple and economic base connecting device which can be welded safely and reliably to the supporting rail of the wiper blade.

Preferably a first melting point is allocated to the first thermoplastic material and a second melting point which is lower than the first melting point is allocated to the second thermoplastic material.

Thus in a corresponding welding process in production of the wiper blade, on melting of the second thermoplastic material, melting of the first thermoplastic material can be safely and reliably prevented.

The second melting point and the predefined melting point preferably lie within a predefined temperature range which lies below the first melting point.

Thus in a simple manner the thermoplastic material with the predefined melting point and the second thermoplastic material can be melted and welded together in a corresponding welding process, wherein the melting of the first thermoplastic material is safely and reliably prevented.

The second melting point and the predefined melting point are preferably approximately the same.

Thus a precise and stable melting and welding of the thermoplastic material with the predefined melting point with the second thermoplastic material can be guaranteed.

According to one embodiment the first melting point is determined such that on melting of the thermoplastic material with the predefined melting point and the second thermoplastic material, a melting of the first thermoplastic material can be avoided.

Thus an undesirable welding of the thermoplastic material with the predefined melting point with the first thermoplastic material can be effectively prevented.

The thermoplastic material with the predefined melting point and the second thermoplastic material preferably have a substantially corresponding composition.

Thus a simple and economic design of the at least one supporting rail and the base connecting device can be achieved.

According to one embodiment the supporting rail is welded to the base connecting device by ultrasound welding in the predefined connecting region.

Thus the supporting rail can be safely and reliably welded to the base connecting device.

On the base connecting device is preferably attached an adapter unit for hinging of the wiping strip on a wiper arm, which unit is formed to connect with a connecting element allocated to the wiper arm.

Thus the wiping strip can easily be connected with the wiper arm.

The problem cited initially is also solved by a supporting rail for a wiper blade which has a spring element provided with a plastic sheath. The plastic sheath comprises at least one first and one second thermoplastic material.

The problem cited initially is also solved by a base connecting device for a wiper blade which can be welded to a supporting rail of the wiper blade. The base connecting device comprises at least one first and one second thermoplastic material.

BRIEF DESCRIPTION OF THE DRAWINGS

The invention is described in more detail in the description below with reference to embodiment examples shown in the drawings, in which.

DETAILED DESCRIPTION

Figure 1:
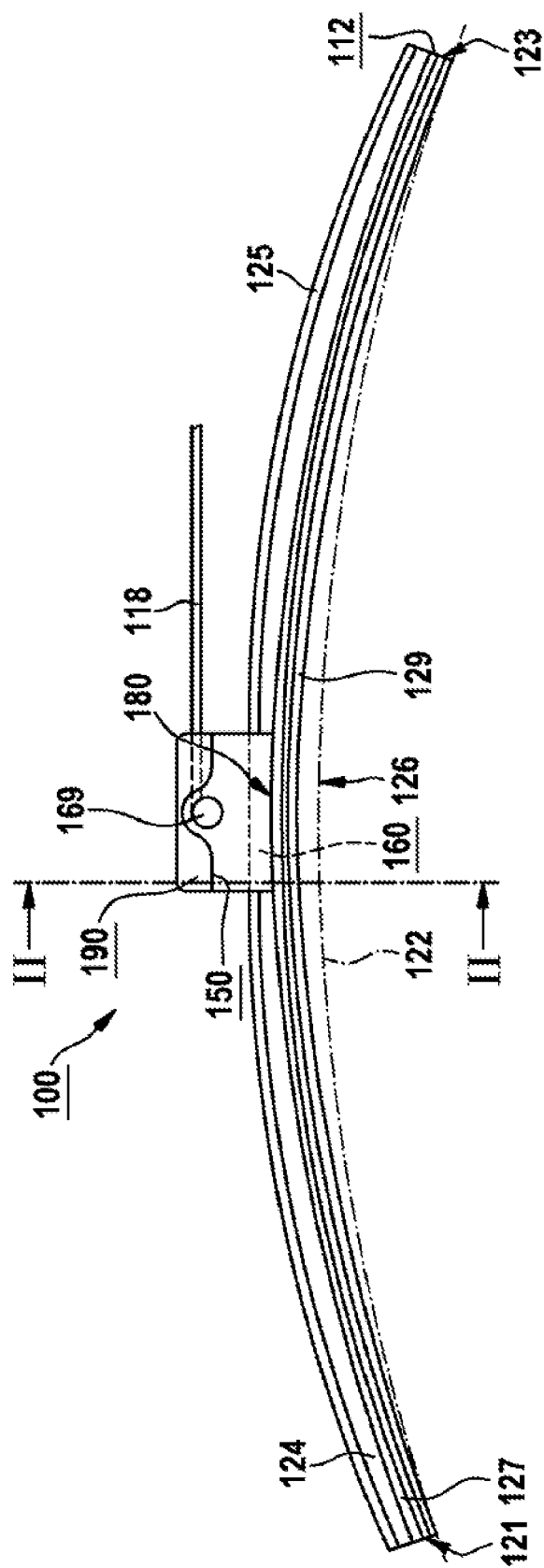
FIG. 1 shows a side view of a wiper blade having a wiping strip on which a base connecting device is attached by means of ultrasound welding, according to one embodiment.

FIG. 1 shows a wiper blade 100 with a wiping strip 112 which comprises a wiper lip 129 connected via a rocker web 127 with a back strip 124. On the back strip 124 is provided a spoiler 125. On the wiping strip 112 is provided a base connecting device 160, to which is attached an adapter unit 150 for connection of a connecting element 190 allocated to a wiper arm 118. The connecting element 190 in FIG. 1 is connected to the adapter unit 150 as an example via a hinge bolt 169. By means of the wiper arm 118 the wiper blade 100 can be guided to wipe over a windshield 122 shown in dotted lines e.g. a motor vehicle windshield.

It is however pointed out that the design of the wiper blade 100 with base connecting device 160 and adapter unit 150 for connection of the connecting element 190 has merely an exemplary character and should not be regarded as a restriction of the invention. Rather alternative embodiments are also possible which again lie within the scope of the present invention, e.g. the base connecting device 160 and the adapter unit 150 can be formed as one piece or the adapter unit 150 and the connecting element 190 can be formed as one piece.

According to one embodiment, the wiper blade 100 is formed in the manner of a flat bar, i.e. the wiping strip 112 has lateral longitudinal grooves (202, 204 in FIG. 2) in which are arranged two supporting rails (212, 214 in FIG. 2), preferably spring rails, as described for example below with reference to FIG. 2. Alternatively the wiping strip 112 can be formed as a hollow profile with an approximately central longitudinal channel (425 in FIG. 4) in which is arranged a single supporting rail (414 in FIG. 4), as described below as an example with reference to FIG. 4.

The wiping strip 112 with the base connecting device 160 provided thereon is formed preferably hinge-free, wherein the base connection device 160 is preferably pre-mounted on the wiping strip 112. According to one embodiment the base connection device 160 is welded to the supporting rails (212, 214 in FIG. 2) by a suitable welding process, e.g. an ultrasound welding process, at least in a predefined connecting region 180 which is predefined for example by an axial extent of the base connecting device 160, as described below with reference to FIG. 2.

In FIG. 1 the wiper blade 100 is not placed completely against the windshield 122; only its axial wiper blade ends 121, 123 lie against the windshield 122 while the wiping strip 112 in the wiper blade center 126, i.e. approximately in the region of the adapter unit 150, is still spaced from the windshield 122. If via the wiper arm 118 a specified contact force is applied to the connecting element 190 and hence the adapter unit 150, the wiping strip 112 lies against the windshield 122. Here an even contact pressure is achieved over the entire wiper blade length even if the screen curvature changes in the course of the wiping movement.

Figure 2:
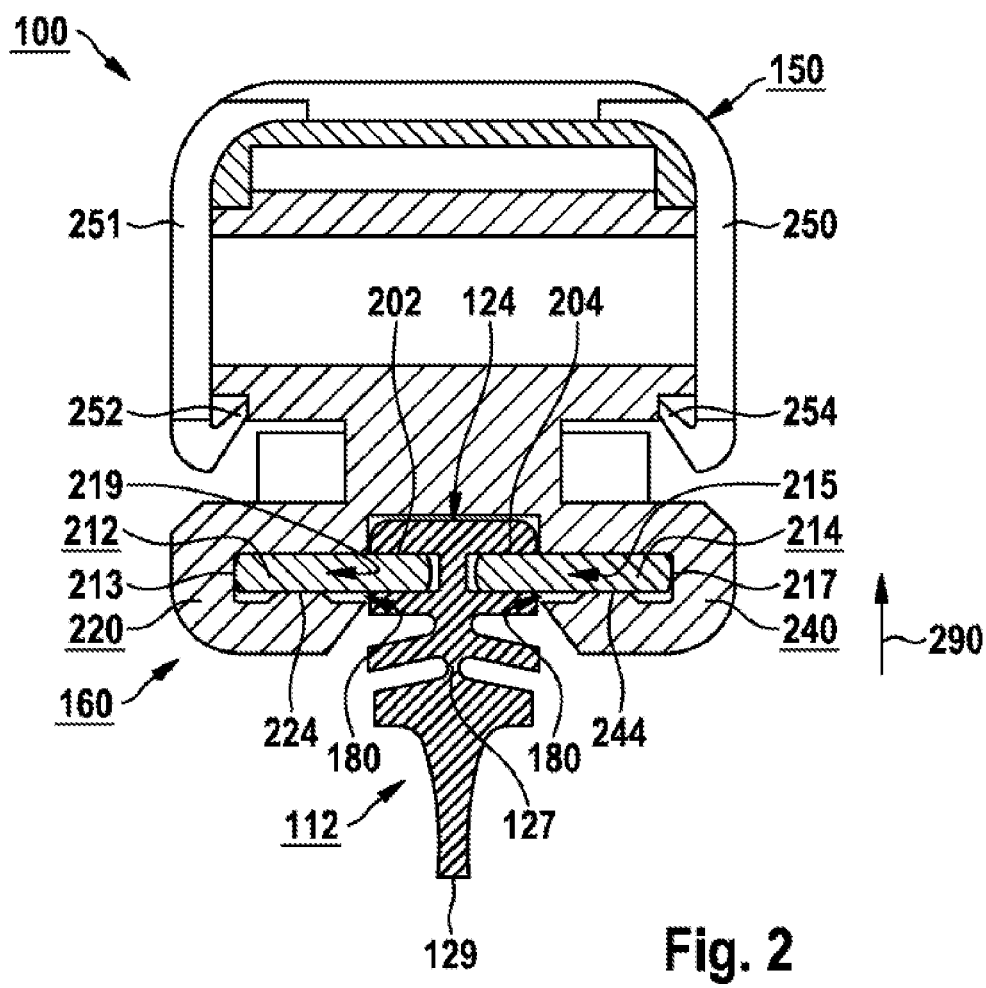
FIG. 2 shows a cross section view of the wiper blade in FIG. 1 before a corresponding ultrasound welding process.

FIG. 2 shows a section view of the wiper blade 100 with the wiping strip 112 and the adapter unit 150 of FIG. 1 in the direction of the arrows marked II in FIG. 1, according to one embodiment before a corresponding welding process. The adapter unit 150 has approximately an inverted U-shaped structure with wall segments 250, 251, on which are formed illustratively hook-like engaging teeth 254 and 252 via which the adapter unit 150 engages on the base connecting device 160. It is however pointed out that the engagement of the adapter unit 150 on the base connecting device 160 has merely an exemplary character and does not serve as a restriction of the invention. Rather the adapter unit 150 can be attached to the base connecting device 160 in any arbitrary manner e.g. by welding or bonding.

The base connecting device 160 preferably comprises at least one thermoplastic material with a predefined melting point and illustratively has two lateral retaining elements 220, 240 which at least in segments surround, in the manner of a claw, the allocated supporting rails 212 and 214 arranged approximately parallel to each other. The supporting rails 212, 214 are arranged in longitudinal grooves 202, 204 formed in the back strip 124 of the wiping strip 112. The supporting rails 212, 214 at their axial ends can thus be connected together e.g. via suitable end caps, as adequately known to the person skilled in the art.

According to one embodiment the supporting rails 212, 214 each have a spring element 219 and 215 provided with a plastic sheath 213 and 217. The spring element 219, 215 can e.g. be formed of hardened steel, titanium, aluminum and/or plastic. The plastic sheath 213, 217 preferably comprises at least one first and one second thermoplastic material, wherein the second thermoplastic material is provided at least in the predefined connecting region 180 and serves for welding of the plastic sheath 213 and 217 to the thermoplastic material of the base connecting device 160, as described below and with reference to FIG. 3.

On the retaining elements 220, 240 of the base connecting device 160, for simplification and improvement of a corresponding welding process, energy directors 224 and 244 are formed. These are pressed, preferably sprung, by the retaining elements 220, 240 against the supporting rails 212 and 214 in the direction of an arrow 290.

To attach the base connection device 160 to the supporting rails 212, 214, energy is introduced into the predefined connecting region 180 e.g. by means of ultrasound, such that first the energy directors 224 and 244 melt and then the second thermoplastic material provided on the supporting rails 212 and 214 and the thermoplastic material of the base connecting device 160. These then fuse together and weld the base connecting device 160 to the supporting rails 212, 214 in the predefined connecting region 180.

According to one embodiment the first thermoplastic material has a first melting point and the second thermoplastic material has a second melting point which is lower than the first melting point, wherein the second melting point and the predefined melting point of the thermoplastic material of the base connecting device 160 lie within a predefined temperature range which lies below, preferably substantially below, the first melting point. Preferably the second melting point and the predefined melting point are approximately the same. To simplify the description, the first melting point is referred to below as the "high" melting point while the second and the predefined melting points are referred to below as the "low" melting point.

The high melting point is preferably determined such that on melting of the thermoplastic material with the predefined low melting point and of the second thermoplastic material, melting of the first thermoplastic material is avoided. Preferably the thermoplastic material with the predefined low melting point and the second thermoplastic material are formed substantially correspondingly or at least have a similar or approximately the same composition.

It is however pointed out that the embodiment described in FIG. 2 has merely an exemplary character and should not be regarded as a restriction of the invention. Many deviations and modifications are possible within the context of the present invention. For example the plastic sheath 213, 217 of the supporting rails 212, 214 can be formed from the thermoplastic material with the predefined low melting point, while the base connecting device 160 comprises the first and second thermoplastic materials described above, wherein the second thermoplastic material is preferably provided on a segment of the base connecting device 160 facing the connecting region 180. In addition e.g. the energy directors 224, 244 can be formed on the plastic sheath 213, 217 of the supporting rails 212 and 214 instead of on the retaining elements 220 and 240 of the base connecting device 160 as shown in FIG. 2.

Figure 3:
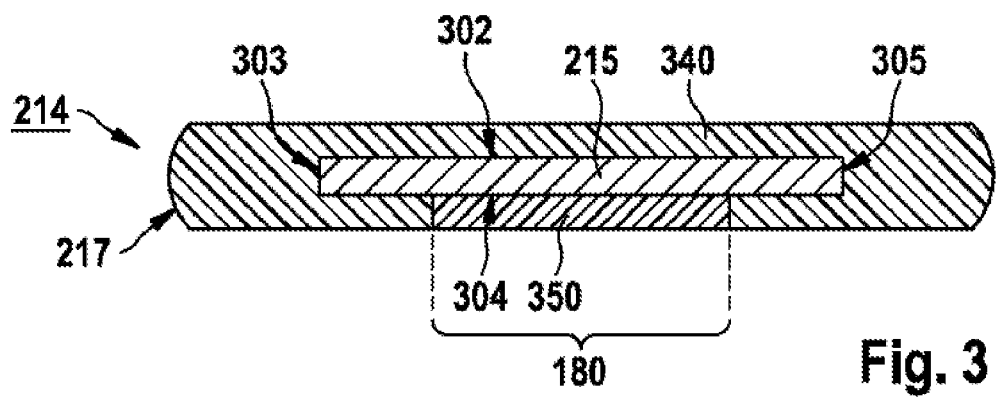
FIG. 3 shows an enlarged view of the section view of a supporting rail of FIG. 2.

FIG. 3 shows the supporting rail 214 with the spring rail 215 and the plastic sheath 217 of FIG. 2 which, according to one embodiment, is formed from a co-extrusion of the first and second thermoplastic material. The spring rail 215 illustratively has two opposing upper and lower wide sides 302, 304 and two opposing left and right narrow sides 303, 305 which are enclosed by the plastic sheath 217.

According to one embodiment a first region 340 of the plastic sheath 217 which comprises approximately the upper wide side 302, the left and right narrow sides 303, 305 and at least segments of the lower wide side 304, is sheathed by the first thermoplastic material with the high melting point. The second thermoplastic material with the low melting point is provided in a region 350 not sheathed by the first thermoplastic material on the lower wide side 304, which in dimensions corresponds approximately to the predefined connecting region 180.

It is however pointed out that the formation of the second thermoplastic material on the lower wide side 304 has merely exemplary character and should not be regarded as a restriction of the invention. Rather the second thermoplastic material can be provided at any arbitrary predefined point on the supporting rail 214 to which the base connecting device 160 of FIG. 2 is to be welded, e.g. at the narrow sides 303 and 305 and/or at the upper wide side 302.

Figure 4:
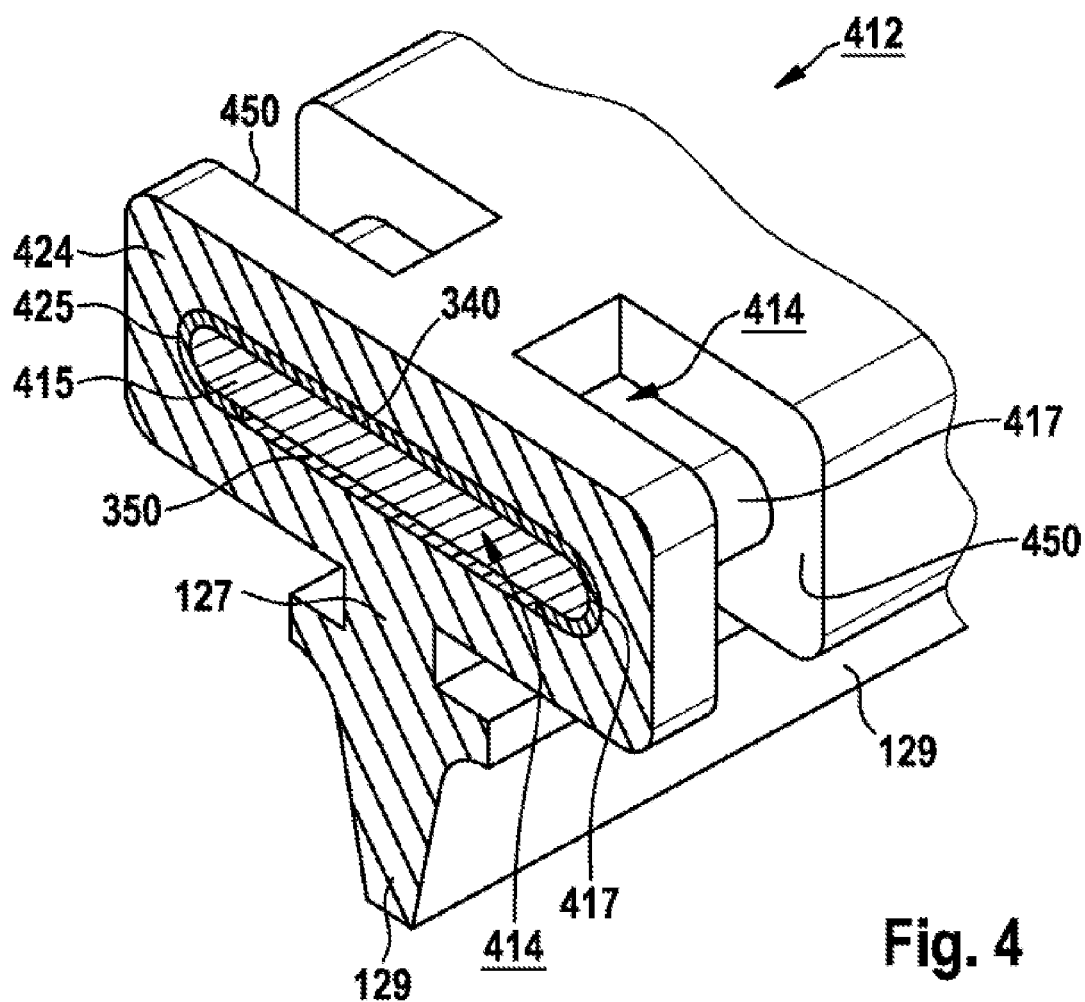
FIG. 4 shows a perspective section view of a wiping strip according to a further embodiment.

FIG. 4 shows a wiping strip 412 according to an alternative embodiment which can also be used in the wiper blade 100 of FIG. 1. The wiping strip 412 has a back strip 424 formed as a hollow profile with an approximately central longitudinal channel 425 in which is arranged a single supporting rail 414.

The supporting rail 414 illustratively has a spring rail 415 provided with a plastic sheath 417, which rail is made e.g. of hardened steel, titanium, aluminum and/or plastic. The plastic sheath 417 is formed for example similarly to the plastic sheath 217 of FIG. 3 and also comprises the regions 340, 350.

The wiping strip 412 illustratively has one or more recesses 450 on its back strip 424. An allocated base connection device (e.g. base connecting device 160 of FIG. 1) has suitable engagement elements (e.g. retaining elements 220, 240 of FIG. 2) which can surround the supporting rail 414 at least in segments through the recesses 450 in order, according to one embodiment, to allow a welding of the supporting rail 414 with the allocated base connecting device as described above with reference to FIG. 2.

The invention claimed is:

1. A wiper blade (100) for a windshield wiper, having a wiping strip (112) defining a longitudinal axis on which there is arranged at least one supporting rail (214) which has a spring element (215), the spring element (215) having sides extending generally along the longitudinal axis and being provided with a plastic sheath (217) extending around the sides, wherein the plastic sheath (217) is welded, at least in a predefined connecting region (180), to a base connecting device (160) which comprises a thermoplastic material with a predefined melting point, characterized in that the plastic sheath (217) comprises at least one first and one second thermoplastic material, each having different melting points, wherein the thermoplastic material having a lower melting point is located in the predefined connecting region (180), and wherein the remaining portion of the plastic sheath (217) comprises the thermoplastic material having a higher melting point, wherein the base connecting device (160) comprises a claw, the claw terminating at a free end and wrapping around the at least one supporting rail (214), and the predefined connecting region (180) of the plastic sheath (217) extends between the free end and the spring element (215).

2. The wiper blade as claimed in claim 1, characterized in that a first melting point is allocated to the first thermoplastic material and a second melting point which is lower than the first melting point is allocated to the second thermoplastic material.

3. The wiper blade as claimed in claim 2, characterized in that the second melting point and the predefined melting point lie within a predefined temperature range which lies below the first melting point.

4. The wiper blade as claimed in claim 2, characterized in that the second melting point and the predefined melting point are approximately the same.

5. The wiper blade as claimed in claim 2, characterized in that the first melting point is determined such that on melting of the thermoplastic material with the predefined melting point and of the second thermoplastic material, a melting of the first thermoplastic material can be avoided.

6. The wiper blade as claimed in claim 1, characterized in that the thermoplastic material with the predefined melting point and the second thermoplastic material have a substantially corresponding composition.

7. The wiper blade as claimed in claim 1, characterized in that the supporting rail (214) is welded to the base connecting device (160) by ultrasound welding in the predefined connecting region (180).

8. The wiper blade as claimed in claim 1, characterized in that on the base connecting device (160) is attached an adapter unit (150) for hinging of the wiping strip (112) on a wiper arm (118), which unit is formed to connect with a connecting element (190) allocated to the wiper arm (118).

9. A wiper blade (100) for a windshield wiper, having a wiping strip (112) defining a longitudinal axis on which there is arranged at least one supporting rail (214) which has a spring element (215), the spring element (215) having sides extending generally along the longitudinal axis and being provided with a plastic sheath (217) extending around the sides, wherein the plastic sheath (217) comprises a thermoplastic material with a predefined melting point and at least in a predefined connecting region (180) is welded to a base connecting device (160), characterized in that the base connecting device (160) comprises at least one first and one second thermoplastic material, each having different melting points, wherein the thermoplastic material having a lower melting point is provided on a segment of the base connecting device (160) contacting the predefined connecting region (180), and wherein the remaining portion of the base connecting device (160) comprises the thermoplastic material having a higher melting point, wherein the base connecting device (160) comprises a claw, the claw terminating at a free end and wrapping around the at least one supporting rail (214), and the predefined connecting region (180) of the plastic sheath (217) extends between the free end and the spring element (215).

10. The wiper blade as claimed in claim 9, characterized in that a first melting point is allocated to the first thermoplastic material and a second melting point which is lower than the first melting point is allocated to the second thermoplastic material.

11. The wiper blade as claimed in claim 10, characterized in that the second melting point and the predefined melting point lie within a predefined temperature range which lies below the first melting point.

12. The wiper blade as claimed in claim 10, characterized in that the second melting point and the predefined melting point are approximately the same.

13. The wiper blade as claimed in claim 10, characterized in that the first melting point is determined such that on melting of the thermoplastic material with the predefined melting point and of the second thermoplastic material, a melting of the first thermoplastic material can be avoided.

14. The wiper blade as claimed in claim 9, characterized in that the thermoplastic material with the predefined melting point and the second thermoplastic material have a substantially corresponding composition.

15. The wiper blade as claimed in claim 9, characterized in that the supporting rail (214) is welded to the base connecting device (160) by ultrasound welding in the predefined connecting region (180).

16. The wiper blade as claimed in claim 9, characterized in that on the base connecting device (160) is attached an adapter unit (150) for hinging of the wiping strip (112) on a wiper arm (118), which unit is formed to connect with a connecting element (190) allocated to the wiper arm (118).

* * * * *